Nov. 14, 1961 G. DEARSLEY 3,008,471
CIGARETTE MAKING MACHINE
Filed Aug. 24, 1956 8 Sheets-Sheet 3
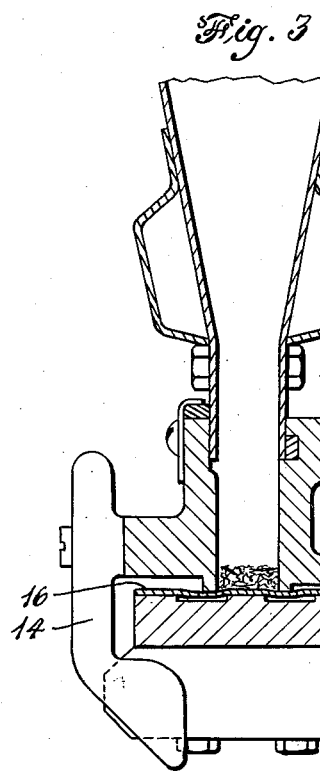
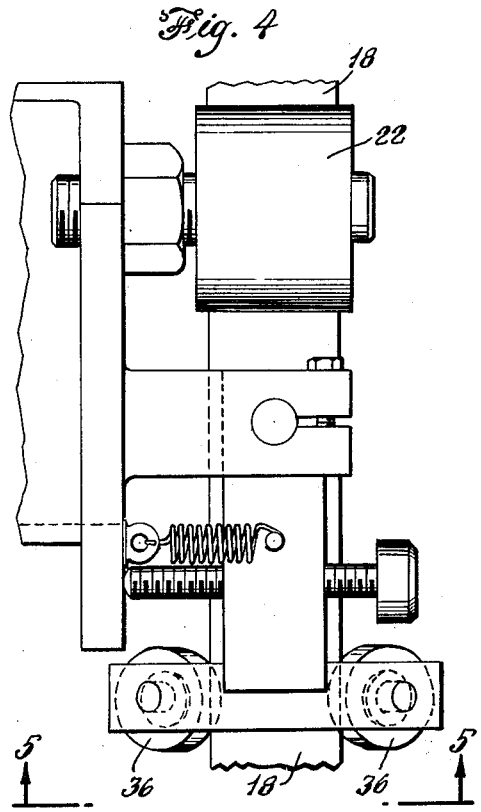
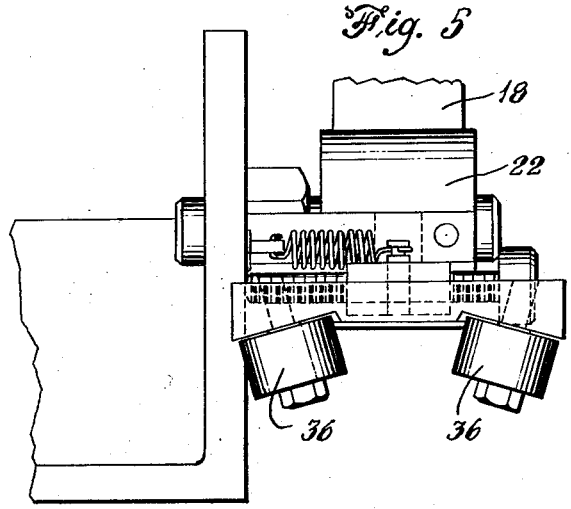
INVENTOR
GEORGE DEARSLEY
BY
ATTORNEY Nov. 14, 1961 G. DEARSLEY 3,008,471
CIGARETTE MAKING MACHINE
Filed Aug. 24, 1956 8 Sheets-Sheet 4
Fig. 6
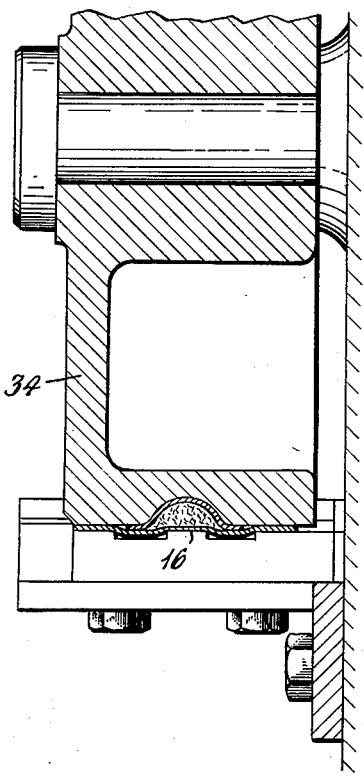
Fig. 7
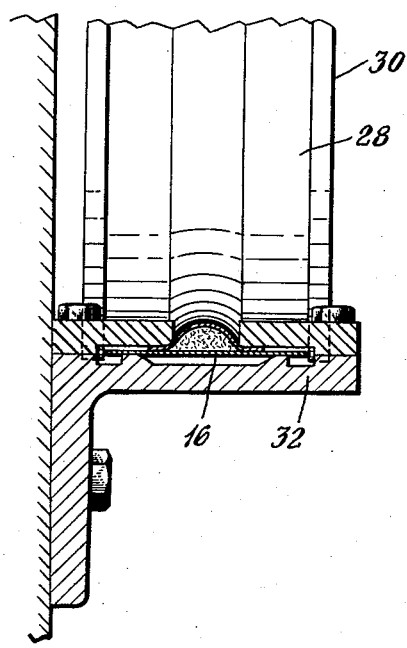
Fig. 8
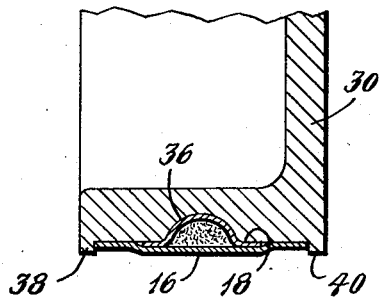
Fig. 9
INVENTOR
GEORGE DEARSLEY
BY
ATTORNEY Nov. 14, 1961 G. DEARSLEY 3,008,471
CIGARETTE MAKING MACHINE
Filed Aug. 24, 1956 8 Sheets-Sheet 5
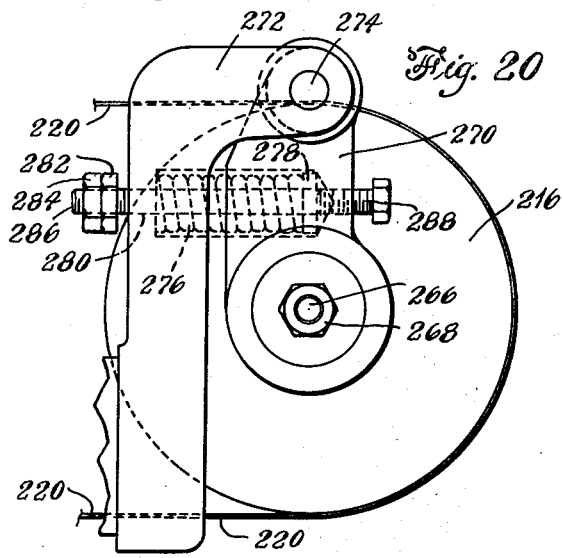
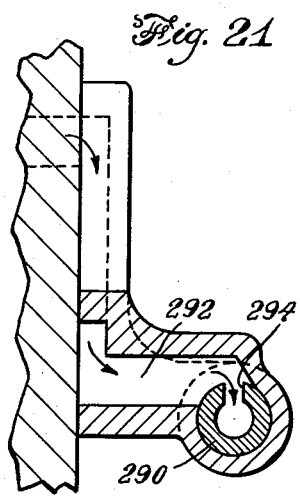
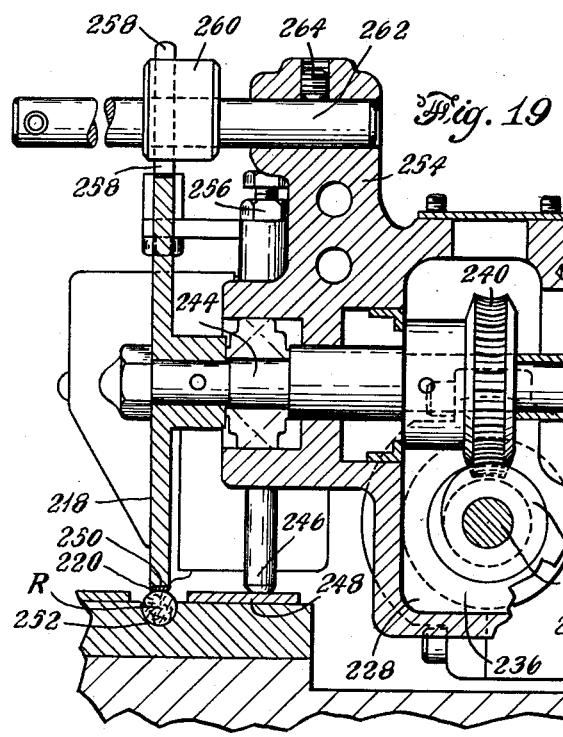
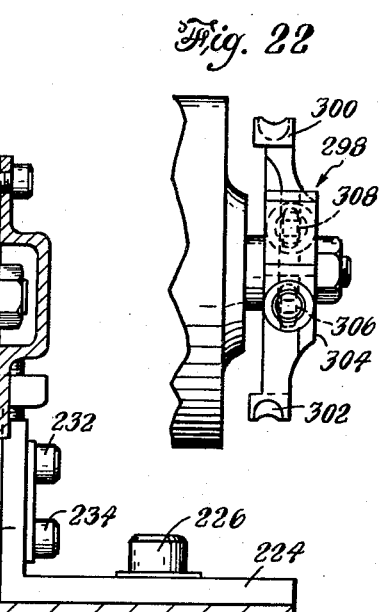
INVENTOR.
GEORGE DEARSLEY
BY
ATTORNEY

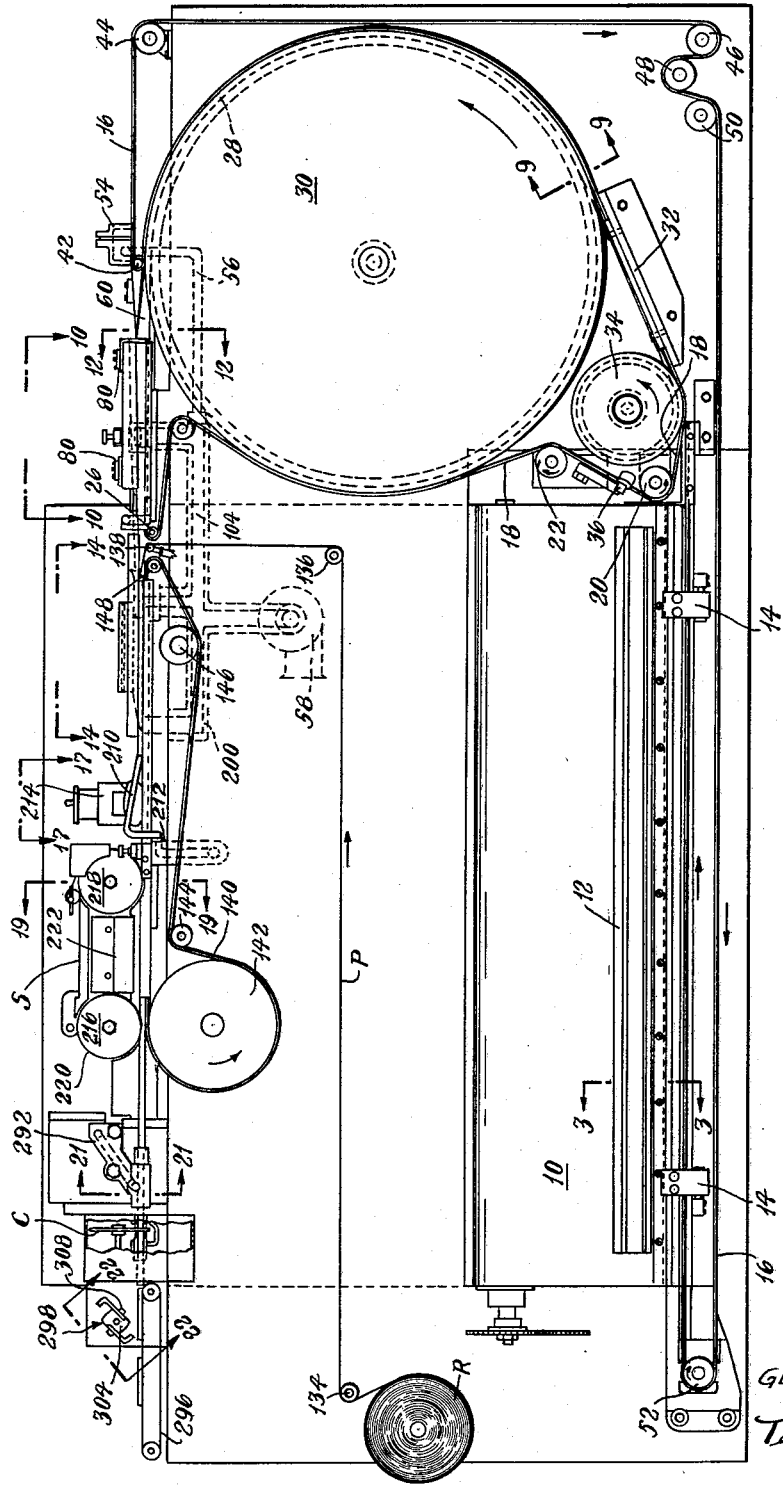

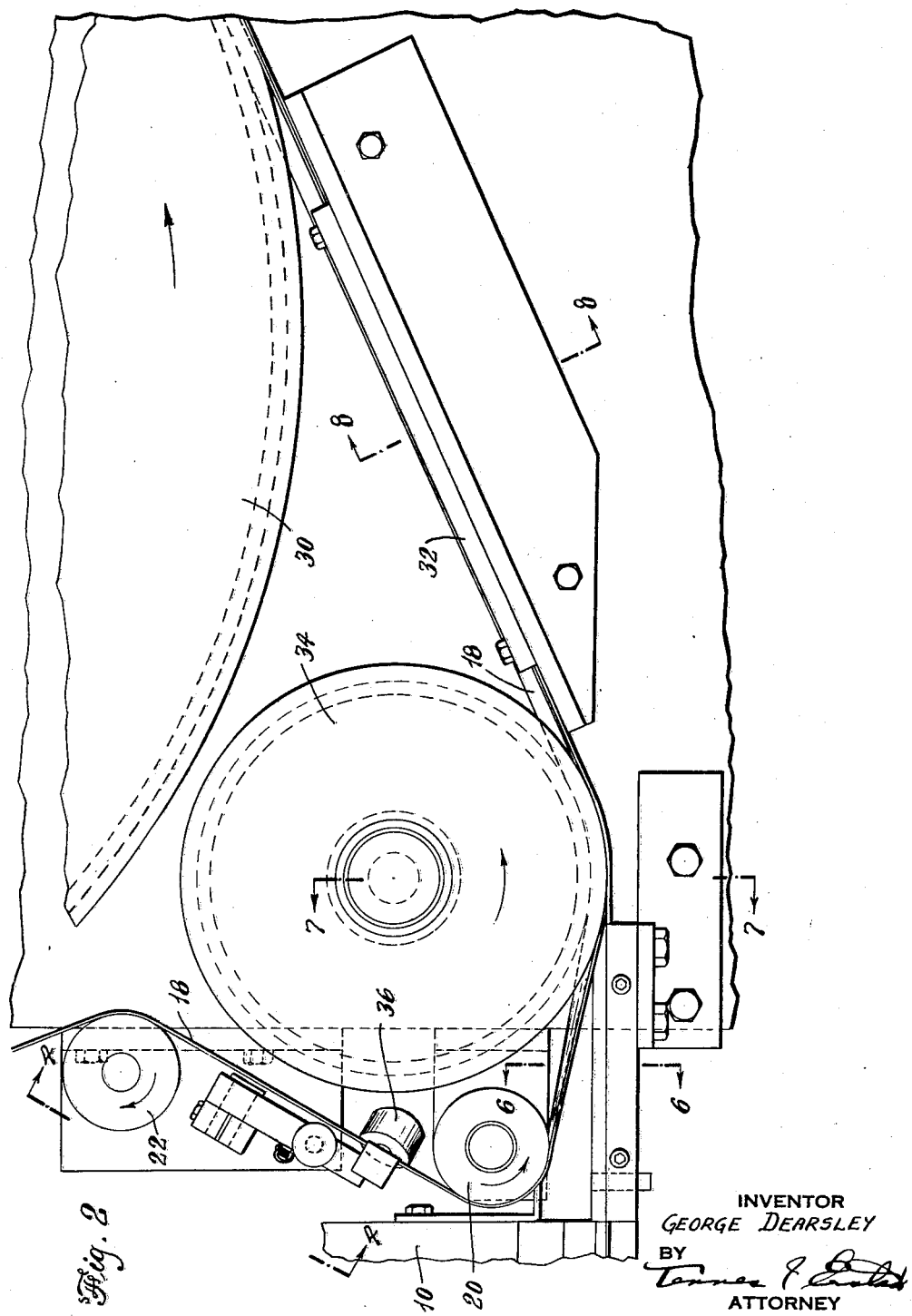

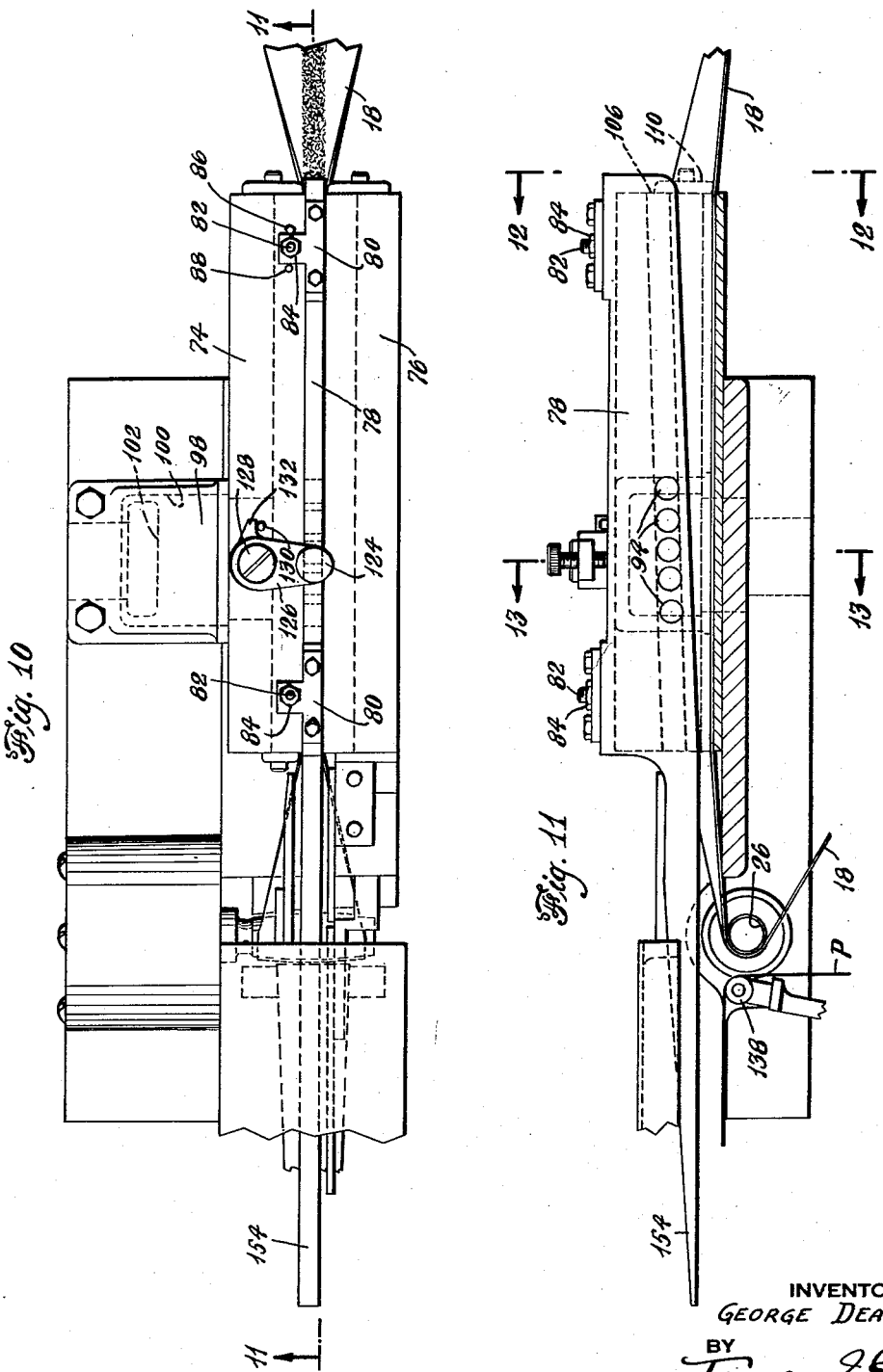

Nov. 14, 1961   G. DEARSLEY   3,008,471
CIGARETTE MAKING MACHINE
Filed Aug. 24, 1956   8 Sheets-Sheet 7
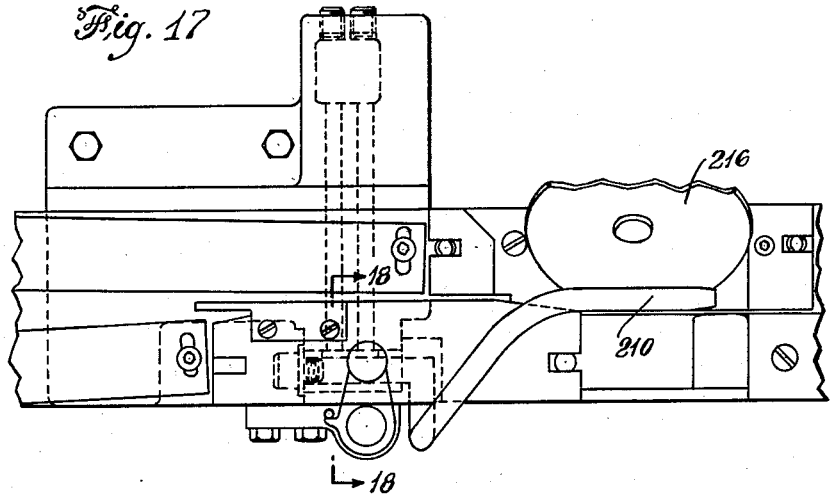
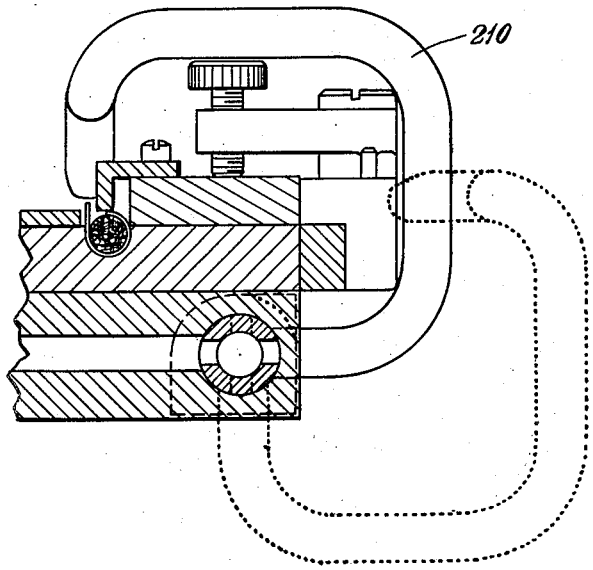
INVENTOR
GEORGE DEARSLEY
BY
ATTORNEY

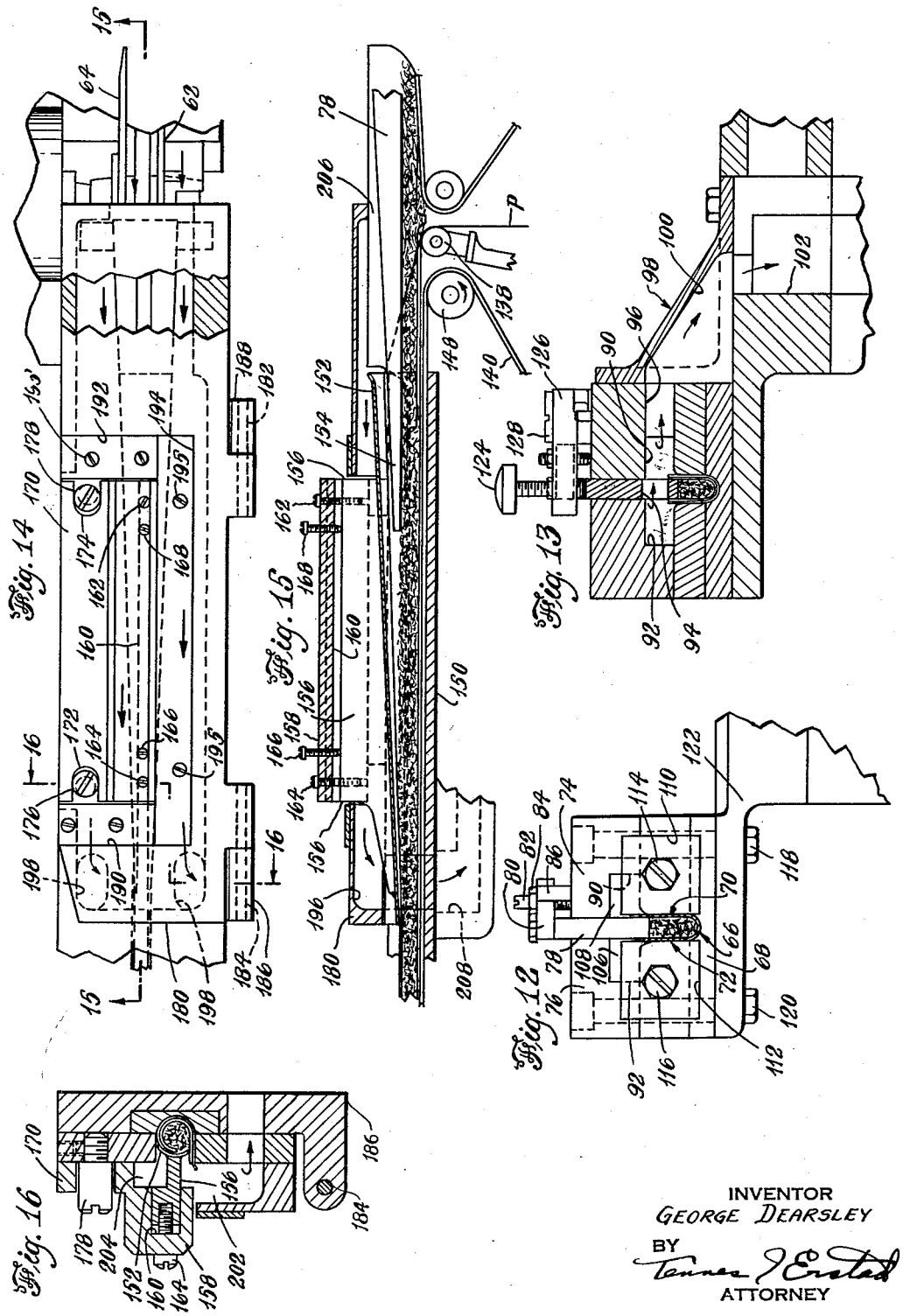

United States Patent Office 3,008,471
Patented Nov. 14, 1961

3,008,471
CIGARETTE MAKING MACHINE
George Dearsley, Raleigh, N.C., assignor to American Machine & Foundry Company, a corporation of New Jersey
Filed Aug. 24, 1956, Ser. No. 606,018
4 Claims. (Cl. 131—84)

This invention relates to a method and apparatus for making cigarettes and particularly to continuous rod, high speed cigarette making machines.

The invention disclosed herein may be used with either a straight line type of continuous rod machine, wherein shredded tobacco is showered to form a stream which is conveyed lengthwise and formed into a rod on approximately the same level as the stream is formed, or a two-level mechane, wherein tobacco is showered to form a stream at one level and the stream is conveyed and formed into a rod at another level.

For purposes of illustration and not with any intention of limiting this disclosure to any particular type of cigarette making machine, I have shown how my invention may be used with a continuous rod type cigarette machine of the two level type.

It is an object of the present invention to provide a rod forming apparatus having dust and tobacco shred removing passageways extending along said rod forming passageway to draw off along the length of the rod, any tobacco particles that escape during the rod forming process.

A further object of this invention is to provide a cigarette making machine wherein the dust collecting elements are incorporated directly into the rod forming apparatus and draw off excess tobacco particles from the under side of the rod former.

A further object is to provide a tongue having two longitudinally extending air passageways formed on each side of the tongue wherein tobacco particles that escape are drawn off from said air passageways downwardly and inwardly from the rod folder bed.

A further object of this invention is to provide a compressor wherein an air passageway extends along each side of the compressor and wherein holes are provided in the compressor bar to permit air from one passageway to be drawn into the adjoining passageway through the holes in the compressor bar.

Another object of this invention is to provide a cigarette making machine having built in particle removing channelways for automatically removing tobacco particles that escape from the tobacco stream as it is being formed into a cigarette rod.

Another object of this invention is to provide an improved simplified sealer wherein the endless steel sealing belt can be readily and quickly removed.

Another object of this invention is to provide a sealer having one roller which is pivotally mounted and spring actuated so that it may be readily swung about its pivot to facilitate the removal and the replacement of the steel belt.

Another object of this invention is to provide a speed-up cam for separating cut lengths of cigarette rod wherein the cam surfaces are adjustably mounted on a driven cam support.

Another object of this invention is to provide a sealer having a worm gear type of drive which would not exert any substantial torque thereon tending to move the sealer housing about its pivotal mounting when driving the rollers supporting the endless, steel sealing band.

Another object of this invention is to provide an improved tongue mounting wherein a tongue support has a channelway for receiving a tongue for adjustable movement up and down and wherein means are provided for locking the tongue support to the folder bed of the cigarette making machine, said mounting having eccentric bolts permitting the sealer tongue to be adjustably set laterally.

Another object is to provide an improved tongue support having a cover plate which surrounds the tongue support and forms therewith an air passageway extending along the length of the tongue support for drawing off air along the length of the tongue support, to remove any tobacco particles that escape from beneath the tongue.

Another object of this invention is to provide a tobacco particle removing device immediately adjacent the end of a belt to draw off tobacco particles immediately after the belt has been flexed around a guide roller.

A further object of this invention is to provide a compressing device which will impart a gradual compression to the tobacco stream prior to its being conveyed around a reversing wheel.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

FIG. 1 is a front elevation of the cigarette making machine.

FIG. 2 is a partial front elevation of the compressor mechanism.

FIG. 3 is a partial sectional end elevation of the tobacco feeding trough taken on line 3—3 of FIG. 1.

FIG. 4 is a side elevation of the compressor belt guiding mechanism as seen from line 4—4 of FIG. 2.

FIG. 5 is an end elevation of the same taken on line 5—5 of FIG. 4.

FIG. 6 is a partial sectional end elevation of the tobacco guides taken on line 6—6 of FIG. 2.

FIG. 7 is a partial sectional end elevation of the tobacco compressing drum taken on line 7—7 of FIG. 2.

FIG. 8 is a sectional end elevation of the belt guides taken on line 8—8 of FIG. 2.

FIG. 9 is a partial sectional end elevation through the rim of the reversing wheel taken on line 9—9 of FIG. 1.

FIG. 10 is a plan view of the tobacco stream compressing device taken on line 10—10 of FIG. 1.

FIG. 11 is a sectional side elevation of the same taken on line 11—11 of FIG. 10.

FIG. 12 is an end elevation of the tobacco compressing device taken on line 12—12 of FIG. 11.

FIG. 13 is a sectional end elevation of the compressing device taken on line 13—13 of FIG. 11.

FIG. 14 is a plan view of the cigarette rod folding mechanism taken on line 14—14 of FIG. 1.

FIG. 15 is a sectional side elevation of the same taken on line 15—15 of FIG. 14.

FIG. 16 is a sectional end elevation of the rod forming mechanism taken on line 16—16 of FIG. 14.

FIG. 17 is a plan view of the paste applying and ironing section of the machine taken on line 17—17 of FIG. 1.

FIG. 18 is a sectional end elevation of the same.

FIG. 19 is a sectional end elevation of the cigarette rod sealing mechanism taken on line 19—19 of FIG. 1.

FIG. 20 is a partial rear view of the same.

FIG. 21 is a sectional end elevation of cigarette guide mechanism taken on line 21—21 of FIG. 1.

FIG. 22 is an end elevation of the cigarette spacing device taken on line 22—22 of FIG. 1.

As mentioned above, while I have for purposes of illustration shown how my invention can be used with a cigarette machine which showers tobacco into a stream at one elevation and forms it into a cigarette rod at another elevation, it will be understood this invention can also be employed in cigarette making machines, which are not of the two level type.

Tobacco is showered from a hopper (not shown) by means of a carding drum and picker wheel (not shown) onto a collecting tape to form a mat of tobacco, in a manner well known in the art. When this mat tobacco reaches the end of the path of travel of the collecting belt a picker or other suitable means showers the tobacco from the collecting belt down a chute 10 shown in FIG. 1.

This chute may be of the type, for example, as shown in U.S. Patent 2,727,518 granted to F. B. Carder on December 20, 1955.

An inspection door 12, pivotally mounted on hinges 14, is provided to enable an operator to open the same to clear out excess tobacco should this become necessary to facilitate the replacement of the tobacco receiving and conveying tape 16. Running along the length of the underside of the chute 10 is a receiving and conveying tape traveling in the direction indicated by the arrow for receiving the tobacco so showered downwardly from the chute 10.

The tobacco so showered is conveyed under a tape 18 which travels over pulleys 20, 22, 24, 26 and the shoulders 28 of reversing wheel 30 through the guide channel 32 and under the compressing roller 34. When the tobacco comes under that area of the path of travel of the belt 18 which is located between the pulley or roller 20 and the compressing roller 34 the stream is reduced in cross sectional area to a size which confines it to a predetermined size where it is held in such compressed condition by the guide channel 32.

The belt 18 is laterally positioned on the roller 20 by means of suitable guides 36 shown in FIGS. 1 and 2. Due to the gradual compression exerted on the tobacco stream at this point, it has been found that the shreds are not axially torn apart from each other and the axial and cross sectional uniformity of the stream is maintained when it is reduced in cross sectional area.

As the compressed tobacco stream leaves the channel 32, it is held in between belts 16 and 18 and continues to be held therebetween after leaving channel 32 while it is conveyed around the reversing wheel 30. Due to the tensioning roller 24 the belt 18 is held tautly on the reversing wheel 30 and forms a longitudinal pocket along its length by seating itself in the channel 36 formed in the periphery of reversing wheel 30.

The edges of the belt 18 are confined between two flanges 38 and 40 as shown in FIG. 9 formed on the reversing wheel. When the collecting tape 16 leaves the reversing wheel 30 it passes around a roller 42 and returns back to the underside of the chute 10 via rollers 44, 46, 48, 50, and 52.

A suction cover 54 is positioned above the belt 16 immediately at the point where it passes around the roller 42. Tobacco shreds in passing around this roller 42, will be temporarily loosened due to the flexing of the belt 16 so that as the belt 16 passes beneath the cover 54 any tobacco thereon will be drawn off through the cover housing 54 through the duct 56 which is connected with a suction fan 58 and is returned and discharged into the hopper of the cigarette making machine.

When the belt 18 leaves the reversing wheel 30, it passes into the compressor block 60 shown in FIGS. 1, 10, 11, and 12, and which has a U-shaped channel or groove 66 formed in the bed 68 of the rod-former mechanism. The upper run of belt 18 slides along the bottom of this U-shaped channel 66 and is confined laterally between side guide blocks 70 and 72. A pair of covers 74 and 76 are mounted on top of the side guides 70 and 72 as shown in FIG. 12. The covers 74 and 76 are spaced from each other so as to permit the receipt therebetween of the elongated compressor bar 78. The compressor bar 78 has ears or lugs 80 extending from the sides at the opposite ends of the bar 78 over the cover 74.

An adjusting screw 82 having a lock nut 84 is provided in each lug 80, to permit the compressor bar 78 to be lowered or raised. A pair of upwardly extending studs 86 and 88 shown in FIGS. 10 and 12 are provided for preventing longitudinal movement of the compressor bar 78 without interfering with its adjustment up and down.

Air channels 90 and 92 are provided for removing any tobacco shreds that escape from between the tape 18 and the compressor bar 78. The compressor bar 78 is provided with a transverse air passageway formed by drilling a series of holes 94 through the compressor bar 78. This connects the air chamber 92 with the air chamber 90. The air chamber 90 has an air channel 96 which is connected with a housing and supporting bracket 98 also having an air chamber 100 (FIG. 13) which connects with the duct 102 (FIG. 10) which, in turn, is connected to an air duct 104 which is connected with the suction fan 58.

Air is drawn through the opening 106 and 108 from the outside atmosphere. The ends of the channels 90 and 92 have openings 106 and 108, and have attached thereto end plates 110 and 112, which are held in place by suitable screws 114 and 116 and act as wear plates against which the tape 18 rubs when entering the U-shaped compressor 60.

The belt 18 and the side guide 70 and 72 and the cover plates 74 and 76 are held compactly together as one complete unit or compressor block 60 by suitable bolts and nuts 118 and 120, which in turn are secured to the framework 122 of the cigarette making machine.

When the suction fan 58 operates, it draws air in through the openings 106 and 108 and through similar openings 109 at the opposite end along the length of the compressor bar 78 out through the air channels 90 and 92. When the air has traveled along the length of their respective channels 90 and 92, picking up as it travels any shreds of tobacco which escaped from between the conveying tape 18 and the compressor bar 78, it will have reached the approximate center of the compressor block 60.

Upon reaching this approximate center the air in channel 92 passes through the transverse orifices 94 formed in the compressor bar 78 into the opposite air passageway 90 and from there the air from both channels 90 and 92 passes out through the ducts 96, 100, and 102 to the suction fan 58 where the tobacco is conveyed back to the hopper (not shown) of the cigarette making machine.

Due to the improved construction of the compressor unit disclosed applicant has been able to remove all escaping tobacco particles without having to have any suction tubes exposed where they would interfere with adjustments made to the machine. Furthermore, this particular construction is highly advantageous in that one is able to remove tobacco particles very effectively by confining the air tsream to a path extending along the entire area from which tobacco particles might escape when being conveyed through the rod forming mechanism.

The compressor bar 78 is locked in position by means of a suitable clamping screw 124 which is supported in a pivoted arm 126 which is pivoted on the screw 128 fixedly mounted in the cover plate 74. A pin 130 against which a lug 132 engages, positions the screw 124 directly above compressor bar 78 so that when the screw 124 is tightened it presses downwardly on top of the compressor bar 78. The distance compressor bar 78 can be moved downwardly is fixed by the adjusting screw 82 and a lock nut 84 which limits the distance the compressor bar 78 descends into the space between the side guides 70 and 72 because of their engagement with the top of the cover plate 74.

When the tobacco, surrounded on its bottom and sides by the tape 18, has been compressed between the side walls 70, and 72 and the compressor bar 78 and emerges from the compressor section 60 it is delivered to the top of the paper tape P as shown in FIG. 1. When the webbing or tape 18 passes over the roller 26 it becomes disengaged from the compressed tobacco stream and returns over roller 24 around the reversing drum 30 back to rollers 22 and 20 when it is again ready to recommence its conveying and compressing cycle of travel.

The paper P is drawn off from a reel R and passes over pulleys 134, 136 and 138 onto the top of the folder tape 140, which travels in the direction indicated by the arrow. The folder tape 140 travels around the ribbon drum 142 and idler rollers 144, 146, and 148, and passes under the folding tongue 152 paste applying section 214 and sealing sections of the cigarette making machine.

The tongue section 152 is shown in FIG. 1 and also in FIGS. 14 and 15. This tongue section 152 consists of a bed 150 over which passes the folder tape 140, carrying the paper web P. Positioned above the paper web P is a conventional, elongated tongue shaped member 152 which is of inverted U-shape in cross-section. As the tobacco passes from underneath the compressor bar 78 shown in FIG. 15, it is already inside and underneath the tongue 152.

It will further be noted that the compressor bar 78 has an elongated tail piece 154 which extends a substantial distance beneath the tongue 152. The tongue-shaped member 152 has a backbone or support 156 to which it is fixedly connected and supported. The backbone 156 extends upwardly inside of a removable support bracket 158 having a channel 160 for receiving the backbone 156.

The backbone 156 is drawn upwardly into the channel 160 by means of the screws 162 and 164 which are threaded into the backbone 156 and pass through openings formed in the supporting bracket 158. Suitable screws 166 and 168 threaded in the bracket 158 push downwardly on the backbone 156, to limit the distance said backbone can move upwardly. Thus the tongue 152, through its backbone 156, is positively held at the elevation desired relative to the bracket 158 by means of the screws 162, 164, 166 and 168.

Bracket 158 has a ledge 170 which rests on top of the framework of the cigarette making machine. The ledge has two U-shaped cutout portions 172 and 174 which are adapted to slip over eccentric locating studs 176 and 178, which control the distance said tongue 152 is moved laterally. A suitable clamp screw, not shown, which may be similar to the clamp screw shown in FIG. 13, is employed for holding the ledge 170 firmly against the frame of the cigarette making machine.

Suitable means (not shown) similar to the lugs 86 and 88, are provided for locating the tongue longitudinally to prevent the ledge 170 from moving lengthwise on the eccentric studs 176 and 178. When the tongue and tongue support have been placed in position, a cover plate 180 is closed over the tongue. The cover plate 180 is pivotally connected by means of pivot pins 182 and 184 to pivot pin supports 186 and 188 which are secured to the frame of the bed 150. The pivoted cover plate 180 can therefore be readily swung back and forth on the pivots 184 and 182.

A set of adjusting covers 190, 192, and 194, are adjustably secured on the cover plate 180 by means of suitable screws 195 to permit a fine adjustment of these plate members up against the bracket 158 to allow for fairly close positioning of the cover plate 180 up against the bracket 158. The inside surfaces 196 of the cover plate 180 provide an air passageway which extends along the length of the tongue and its supporting members. The internal, cut-away portion 196 of the cover plate 180 connects with a duct 198 shown in FIGS. 14 and 15. The ducts 198 connect with the air passageway 200 shown in FIG. 1 which in turn connects with the suction fan 58.

As shown in FIG. 16, there is an air passageway 202 and 204 extending along each side of the backbone 160. It will thus be apparent that when the suction fan 58 draws air through the channel 200 it will cause air to flow through duct 198 and air will be drawn along the length of the tongue from the outside atmosphere through the openings 206 in the direction shown by the arrow in FIGS. 14 and 15. Air will also seep through the space between the adjusting plates 190, 192, and 194 and the supporting bracket 158. This flow of air from these various sources cause any tobacco particles or shreds escaping from underneath the tongue 152 as it is compressed will be picked up and conveyed back through the channels mentioned and the suction fan 58 back to the source of supply.

It will further be noted that applicant has provided a dust removing system which is readily accessible from the surface by merely swinging back the cover plate 180 and at the same time has provided a dust removal system which extends along the entire length of the tongue 152 so that any tobacco shreds that escape from between the tongue 152 and the paper web P and the folder tape 140 will be picked up by the air stream and carried along the air passageways 202 and 204 out through ducts 198.

It will be further noted that air is drawn along the tongue through ducts 202 and 204 out through downwardly extending ducts 198. The downwardly extending ducts 198 are connected with each other on the under side of the folder tape by means of an interconnecting duct 208. The vertical ducts 198 together with the interconnecting duct 208 are connected by an air passageway 200 to the suction fan 58.

When the cigarette tobacco and the folder tape and the paper web P surrounding the tobacco pass from underneath the tongue as shown in FIG. 16, one side of the paper will be projecting upwardly while the opposite side of the paper web P and folder tape will be wrapped around the tobacco.

To be sure that there are no particles of tobacco adhering to the upwardly extending paper when it leaves the tongue 152 as shown in FIGS. 17 and 18, there is provided a blow pipe 210 which blows a constant stream of air on the upwardly extending paper tape at this point. This blow pipe 210 is pivotally connected to air ducts 212 which pass underneath the folder bed to a conventional blower (not shown). The connection between the blow pipe 210, and the air ducts 212 is a pivotal one so if there is a desire to make any adjustment with respect to the ironing and sealing sections of the cigarette making machine, the pipe 210 can be readily swung out of place and when the pipe is in place there are no undesirable projections as formerly, so that the machine now has a clear, open type construction. When the pipe 210 is swung away from its operating position, its internal air ducts 211 are swung transversely in front of the air passageway 212 thereby stopping the flow of air through pipe 210.

A conventional paste supplier 214 is provided having a disc which rotates to apply paste from the periphery thereof onto the upwardly extending edge of the paper web P. When the edge of the upwardly extending paper P and folder belt 140 passes the paste supplier 214 the other side of the folder belt 140 is allowed to be separated from the paper tape P while the paper tape P is supported around the tobacco filler. The upwardly extending paste carrying edge of the cigarette paper P is then ploughed over the coiled portion of the paper so as to paste the same together to form a cigarette rod, after which the lapped portions of the paper rod pass under what is commonly known in the art as a sealer S. The sealer S consists of a pair of rollers 216 and 218 around which travels an endless steel band 220. The steel band 220 is heated by a heating element 222 so that as it glides along the lapped edges of the pasted portion of the rod it will dry and seal the same.

The sealers disclosed in this application is of a new and improved design. Heretofore sealers were of such design that it was quite difficult to remove, adjust, and replace the steel, endless belt which traveled around the rollers. Another disadvantage of the type of sealers available heretofore was that when a cigarette machine was in operation it was frequently necessary to lift the sealer away so as to permit the machine to be operated for adjustment purposes, without making a finished rod.

To facilitate this all sealers are pivotally mounted to enable them to be lifted, but due to the continuous driving movement imparted to the sealer mechanism there was always a tendency for this drive to push the sealer back on top of the rod. To avoid this tendency it was previously necessary to employ a brake which would hold the sealer away from the rod when it was lifted.

It is the purpose of the present invention to provide a sealer S having a drive construction which will allow the sealer to continue its rotation when it is lifted away from the rod and will have substantially no torque exerted by this driving movement which will tend to swing the sealer S back on top of the rod after it has been lifted away from the rod.

Another important feature of the sealer disclosed herein is the mounting for the endless steel belt driving rollers which will permit the steel belt to be quickly loosened and replaced.

The sealer S shown in FIG. 1 is illustrated in detail in FIGS. 19 and 20, and consists of a supporting bracket 224 which is bolted in place to the framework of the cigarette making machine by means of a suitable bolt 226. A pair of sleeve bearings 228 are connected to the upwardly extending angle 230 by means of bolts 232 and 234. The bearing 228 rides on the cylindrical cast housing 236. The cast housing 236 carries a worm gear 238 which drives the gear 240 through a shaft 242. The gear 240 is fixedly mounted on a transverse shaft 244 which has fixedly mounted on the end thereof the endless steel belt driving pulley 218.

A stop pin 246 which engages with the sealing bed 248 is provided for spacing the periphery 250 of the driving roller 218 from the bottom of the channel 252 supporting the sealed cigarette rod. The distance the periphery 250 will be spaced from the bottom of the channel 252 depends upon the diameter of the cigarette rod being manufactured.

The stop pin 246 is threaded in the sealer casting 254 and is locked in place by a lock nut 256. A suitable scraper blade 258 is mounted above the endless steel sealing tape to scrape off any paste that might adhere to the sealing band. The knife scraper 258 is adjustably mounted in the block 260. The block 260 is fixedly secured on the shaft 262 which in turn is held in locked position by the lock bolt 264 which regulates the amount of scraping tension exerted on the steel scraping blade 258.

Due to the worm gear type of drive that has been employed in this apparatus, there is substantially no torque being exerted on the housing 254 to move it into either operative or inoperative position, and if an operator raises the housing 254 to lift the steel band 220 out of engagement with the cigarette rod there will be no tendency for the housing 254 to be pushed back on top of the rod, and, similarly, if the steel band is placed on top of the rod there will be no tendency for the housing to be elevated due to the action of the driving mechanism therefor. The steel band can therefore be continuously driven at all times, regardless of whether it is resting on top of the rod or out of contact with the rod.

As will be appreciated, it will be desirable to continue the rotation of the steel band regardless of whether it is in operative or inoperative condition to prevent the paste from hardening thereon, and to continuously remove paste therefrom. Similarly, no one portion of the endless steel band will remain in contact with the heating element for an extended period but will constantly be moving past the same.

In FIG. 20 I have shown in detail the manner in which the wheel 216 is mounted to facilitate the removal and replacement of the endless steel sealing band 220. The pulley 216 is fixedly mounted on a shaft 266 and is fixedly held thereon by a nut 268. The shaft 266 is carried in a lug support 270 which is pivotally connected to a bracket 272 by a pivot pin 274.

A spring 276 is confined by the bolt head 278 which extends through a hole 280 formed in bracket 272. A nut 282 limits the distance said spring can expand outwardly. A lock nut 284 is provided for locking the nut 282 on bolt 286. A bolt 288 is threaded in the lug 270 so that when it is tightened, the end of the bolt comes in contact with the head 278 of bolt 286. The tightening of bolts 288 causes the lug 70 to swing the roller 216 outwardly, thus tightening the steel belt 220. Additional tightening of the bolt 288 causes pressure to be exerted on the spring 276. The outward exertion of pressure of the spring 276 applies spring tensioning force to the endless steel band 220.

To remove the steel band 220 all that has to be done is to loosen the screw 288 and the arm 270 can then be freely pivoted on its pivot 274 thus allowing the wheel 216 to be moved inwardly so as to allow the band 220 to be removed and another band to be replaced thereon. This construction avoids a considerable amount of down time in a cigarette machine which would otherwise be necessary to effect a replacement of the sealing band after it has completed its working life.

When the cigarette passes from the sealer it enters into a ledger guide 290 shown in FIGS. 1 and 21 through which the cigarette passes. Due to the fact that the guide 290 is usually colder than the cigarette rod which has just left the heated sealer band 220, there is a tendency for moisture to condense around the ledger 290 which has been found objectionable in that it damages the cigarette rod and interferes with the cut-off.

Applicant has found that by blowing a stream of air down through a duct 292 into the center of the sealer guide 290 he will force air to travel through the longitudinal slitted opening 294 where the seam of the cigarette rod moves. The air blowing through this cut-out removes any moisture that might otherwise condense without interfering with the operation of the ledger guide 290.

When the cigarette gets to the end of the ledger guide a conventional cut-off knife C severs the rod into predetermined lengths after which the severed cigarettes are discharged onto a spacing belt 296 having a cam spacer 298 coacting therewith to separate the severed cigarettes from one another.

Due to the fact that the diameter of the cigarettes manufactured at a given time may differ from those it is desired to manufacture at another time, it is necessary to adjust the spacing between the presser members 300 and 302 and the spacing belt 296.

With the design I have shown in FIG. 1 and 22, the pressers 300 and 302 are adjustably mounted on a block 304 by means of nuts 306 and 308. The pressers 300 and 302 have surfaces which engage with corresponding surfaces formed on the block 304 so that they will always be properly aligned with respect to each other. It will be apparent from this construction that it is a relatively simple matter to adjust the pressers with respect to their spacing from the spacing belt 296 by merely loosening the nuts 306 and 308 to enable the pressers 300 and 302 to be set higher or lower, instead of having to replace this entire unit as was heretofore necessary.

The invention herein above described may be varied in construction within the scope of the claims, for the particular device selected to illustrate the invention is but one of the many possible embodiments of the same. The invention, therefore, is not to be restricted to the precise details of the structure shown and described,

What is claimed is:

1. In a cigarette making machine, a tobacco rod former mechanism comprising a longitudinally extending hollow compressor housing having open air inlet ends and a bottom portion formed with a U-shaped channel for receiving tobacco shreds to be compressed, a conveyor belt movably extending along the bottom of said channel, a compressor bar received in said channel and impervious along substantially a major portion of its length and dividing said housing into a pair of chambers, said compressor bar having a transverse passageway of limited extent in the direction of movement of the tobacco rod and constituting the sole communication between said chambers connecting said chambers to cause air to be drawn along the length of said compressor bar, said bottom portion of the housing having an air suction outlet at substantially the level of said transverse passageway and duct means for connecting said passageway and said chambers with suction means.

2. In a cigarette making machine, a tobacco rod former mechanism, comprising a compressor bed formed with a concave longitudinally extending groove, a pair of spaced guide blocks secured to said bed, extending vertically along the length of said groove's edges, said groove and said blocks defining a channel for the passage of tobacco shreds, a conveyor belt movably extending along the bottom of said channel, a U-shaped cover secured to said bed and extending above said blocks, said cover having a top portion provided with a longitudinal opening aligned and extending along the length of said channel, a longitudinally extending compressor bar received through said opening into said channel and being impervious along substantially a major portion of its length, said bar defining with said blocks and said cover a pair of longitudinally extending open end chambers for confining air to substantially lengthwise movement along the length of said compressor bar, said bar having a transverse passage of limited extent in the direction of movement of the tobacco rod and constituting the sole communication between said chambers connecting said chambers, said cover having a side portion provided with an outlet opening at the level of said transverse passageway and duct means for connecting said passageway and said chambers with suction means to cause air to be drawn along the longitudinally extending chambers.

3. In a cigarette making machine, a tobacco rod former mechanism, comprising a compressor bed formed with a concave longitudinally extending groove, a pair of spaced guide blocks secured to said bed, extending vertically along said groove's edges, said groove and said blocks defining a channel for the passage of tobacco shreds, a conveyor belt movably extending along the bottom of said channel, a U-shaped cover secured to said bed and extending above said blocks, said cover having a top portion provided with a longitudinal opening aligned with said channel, a longitudinally extending compressor bar which is impervious along substantially a major portion of its length received through said opening into said channel, said bar defining with said blocks and said cover a pair of longitudinally extending open end chambers, said bar having a transverse passageway of limited extent in the direction of movement of the tobacco rod and constituting the sole communication between said chambers connecting said chambers, said cover having a side portion provided with an outlet opening at the level of said transverse passageway and a downwardly turning duct member connected to said outlet opening for connecting said passageway and said chambers with suction means to cause air to be drawn along the length of said longitudinally extending open end chambers.

4. In a cigarette making machine, a tobacco rod former mechanism, comprising a compressor bed formed with a concave longitudinally extending groove, a pair of spaced guide blocks secured to said bed, extending vertically along said groove's edges, said groove and said blocks defining a channel for the passage of tobacco shreds, a conveyor belt movably extending along the bottom of said channel, a U-shaped cover secured to said bed and extending above said blocks, said cover having a top portion provided with a longitudinal opening aligned with said channel, a longitudinally extending compressor bar which is impervious along substantially a major portion of its length received through said opening into said channel, said bar defining with said blocks and said cover a pair of longitudinally extending open end chambers, said bar having a transverse passageway of limited extent in the direction of movement of the tobacco rod and constituting the sole communication between said chambers connecting said chambers, said cover having a side portion provided with an outlet opening at the level of said transverse passageway for drawing air along said longitudinally extending open end chambers out through said outlet to remove dust and shreds escaping along said compressor bar and means for vertically adjusting the position of said compressor bar relative to said channel.

References Cited in the file of this patent

UNITED STATES PATENTS

| | | |
|---|---|---|
| 711,987 | Ludington | Oct. 28, 1902 |
| 779,431 | Lawless | Jan. 10, 1905 |
| 1,072,272 | Smith | Oct. 7, 1913 |
| 1,705,224 | Molins | Mar. 12, 1929 |
| 1,824,392 | Bronander et al. | Sept. 22, 1931 |
| 1,907,587 | Rundell | May 9, 1933 |
| 1,951,589 | Werner | Mar. 20, 1934 |
| 1,992,723 | Smith | Feb. 26, 1935 |
| 1,992,749 | Gwinn | Feb. 26, 1935 |
| 2,010,486 | Herrmann | Aug. 6, 1935 |
| 2,235,853 | Smith | Mar. 25, 1941 |
| 2,308,323 | Williams | Jan. 12, 1943 |
| 2,342,803 | Herrmann | Feb. 29, 1944 |
| 2,362,225 | Ruau | Nov. 7, 1944 |
| 2,432,938 | Ruau | Dec. 16, 1947 |
| 2,617,426 | Patterson | Nov. 11, 1952 |
| 2,660,178 | Rault | Nov. 24, 1953 |

FOREIGN PATENTS

| | | |
|---|---|---|
| 673,628 | Germany | Apr. 1, 1939 |
| 967,738 | France | Apr. 5, 1950 |
| 1,098,119 | France | Mar. 2, 1955 |